(No Model.)

W. T. DOREMUS.
DRAFT, CHECK, OR OTHER MONEY ORDER OR INSTRUMENT.

No. 376,949. Patented Jan. 24, 1888.

WITNESSES:

INVENTOR:
W. T. Doremus
BY Munn & Co.
ATTORNEYS.

UNITED STATES PATENT OFFICE.

WILLIAM T. DOREMUS, OF FLATBUSH, NEW YORK.

DRAFT, CHECK, OR OTHER MONEY ORDER OR INSTRUMENT.

SPECIFICATION forming part of Letters Patent No. 376,949, dated January 24, 1888.

Application filed June 27, 1887. Serial No. 242,662. (No model.)

*To all whom it may concern:*

Be it known that I, WILLIAM T. DOREMUS, of Flatbush, in the county of Kings and State of New York, have invented a new and useful Improvement in Drafts, Checks, and other Money Orders or Instruments, of which the following is a full, clear, and exact description.

This invention is designed as an improvement upon the blank draft, check, or other money order or instrument for which Letters Patent No. 322,166 were issued to me on July 14, 1885; and it has for its object the more perfect or absolute prevention, when the instrument is properly filled out, of altering or changing the same—as, for instance, the "raising" of it, or making it represent a larger sum than the one originally expressed on the face of it.

The invention, like my former one above referred to, relates to a draft, check, or other money order or instrument made with spaces and provided with numerals and words, whereby the said draft, check, or other money order or instrument can be filled out in such a manner as to prevent it from being raised, or made to represent a larger sum than that for which it was drawn; and it furthermore has reference to instruments or blanks of this character, which are prepared so that the signature can readily be combined with figures expressive of the denomination and amount, so as to represent either exactly or within certain limits the sum for which the instrument was given.

The invention consists in a blank draft, check, money order or instrument made to provide in a special manner for the above-mentioned double protection—that is, in order to alter or raise the money-instrument it is necessary not only that the amount as written out on the face of the instrument or the sum of the largest denomination expressed should be raised and a different sum written over the erasure, but also that the signature to the instrument be erased and be rewritten to correspond. My special manner of doing this is by combining with the leading features of my former patent, hereinbefore referred to, and as hereinafter described, a certain supplementary index to that in which there are a series of consecutive numbers or characters and denomination-names applied to the longitudinal spaces or lines of the instrument, said supplementary index being composed of a series of corresponding numbers or characters applied to said longitudinal spaces or lines, but out of line with the numerals or characters applied to said spaces or lines at the other end of the instrument, substantially as hereinafter specified.

Reference is to be had to the accompanying drawings, forming a part of this specification, in which similar letters of reference indicate corresponding parts in both the figures.

Figure 1 is a face view of a blank check embodying my invention, and Fig. 2 is a similar view of the check filled out for a given sum and signed by the maker.

I have only here shown a combination of lines and figures indicating amounts in dollars and as running from "units" to "thousands;" but it will be obvious that the scale may be extended to cover any amounts, and, if desired, cents or fractions of a dollar.

The check is prepared with a blank space, A, to receive the date when the check is drawn and a blank space, B, to receive the name of the payee. The name of the place where the check is drawn, as also the name of the drawee on the upper portion of the check, may also be left in blank, if desired. Below the spaces A B are six or more longitudinal plain and shaded spaces, or "lines," as they may be termed, C, and which for a portion of their length are divided into spaces D by cross or vertical lines *b*. Over the first space D, at the one or left-hand side of the check, is an index and the dollar-sign, ($,) and at the upper ends of the following spaces D are the numerals 1, 2, 3, 4, 5, 6, 7, 8, 9, with the cipher (0) beyond them or following the numeral 9, if desired, in regular order. In the first transverse space D, upon the longitudinal lines or spaces C, or certain of them, beginning upon a lower longitudinal line or space C, are the numerals 1, 2, 3, 4, accompanied by the words "units," "tens," "hundreds," "thousands," and so on, according to the number of the lines or spaces C used to express the different denominations. The two lower lines or spaces C within the first transverse space or section D may be left blank, or the lowermost one of all have the dollar-sign in its corner.

Upon the opposite or right-hand side of the check, on the spaces or lines C, beginning at the bottom, or otherwise, one, two, or more lines or spaces C, out of line with the numerals 1, 2, 3, 4 in the first transverse space D, are corresponding numerals 1, 2, 3, 4, forming a second index, E. Other characters in place of the numerals 1, 2, 3, 4—such as letters of the alphabet—may be used in the two indexes at opposite ends of the check, and such would be the equivalent of numerals.

In filling out the check the sum for which the said check is drawn is written out in words on the line or space C in which occurs the name of the highest denomination in the sum of the check—as, for instance, if the highest denomination in the sum is thousands, the words should be written upon the thousands space or line C. If the highest denomination mentioned is hundreds, the words should be written upon the line or space C marked "hundreds," and so on if the highest denomination be tens or units, or whatever it may be. Furthermore, the sum of the check should be commenced to be written directly under the numeral over the upper line or space C in the numbered columns or spaces D representing the number of the highest denomination mentioned in the sum. These directions may be more briefly expressed by stating that the sum of the check should be commenced to be written directly under the figure expressing the sum of the highest denomination to be written, and on the line of the same denominational name. For example, if the highest denomination and amount is two thousand, the writing of the sum should begin under the numeral 2 over the upper line or space C, and should be upon the line or space C marked "thousands," as shown in Fig. 2. In case there is not room for the whole sum to be written in the line or space C in which the writing is begun, it can be completed in the next space.

This so far does not essentially differ from the safety-check described in my Letters Patent hereinbefore referred to. By combining, however, with this arrangement of numerals, words, and lines and spaces the second index, E, having its numerals which correspond to the numerals in the index on the opposite end of the check out of line with them by one, two, or more spaces C, I very materially improve the safety character of the check, without having to resort to puncturing it or inserting by the pen special numbers on different lines or spaces indicating the amount. Thus the signature to the check is commenced upon a line or space C below that on which the amount was commenced to be written, (here shown in Fig. 2 as the second space or line C below;) but the number of lines below, it will be obvious, may be changed. The signature is commenced to be written upon such lower line or space C directly under the first word of the sum written, such line or space being the one upon which the numeral in the index E is that corresponds with the numeral in the opposite or left-hand index upon the space or line C above on which the sum was commenced to be written. For example, in Fig. 2 the signature is commenced to be written under the first word "two" of the amount on the space or line C numbered 4 in the left-hand index, and is written commencing in the space D numbered 2 (which expresses the sum of the highest denomination in the amount) upon the second line or space C below, which is numbered 4 in the index E, corresponding with the number in the other index upon which the amount was commenced to be written, and which number indicates the highest denomination of the amount.

The same method holds good whatever the highest denomination or sum of the highest denomination may be, and whether the amount be made up of several denominations or one only, the lines and spaces in which the amount and signature are commenced to be written of course being changed to suit. This makes a duplex check, which will readily indicate upon the face of it, both in viewing the amount and the signature, or either, whether the check is genuine or has been altered. Furthermore, the sum of the largest denomination written on it cannot be changed without rewriting the signature to correspond, which would make a new check, and consequently release the maker of the original check from all responsibility.

Having thus fully described my invention, I claim as new and desire to secure by Letters Patent—

A blank draft, check, money order or instrument made, substantially as herein shown and described, with a series of longitudinal spaces or lines, C, and cross-spaces D, a series of consecutive numbers or characters and denominational names applied to said spaces or lines C at or near one end of the check or instrument, an additional index, E, composed of a series of corresponding numbers or characters applied to the spaces or lines C at or near the opposite end of the instrument out of line with the numerals or characters on said spaces or lines at the other end of the instrument, and a series of consecutive numbers applied to the cross-spaces D, or certain of them, as and for the purposes set forth.

WILLIAM T. DOREMUS.

Witnesses:
A. GREGORY,
EDWD. M. CLARK.